United States Patent
Vaquer et al.

(10) Patent No.: US 12,410,985 B2
(45) Date of Patent: *Sep. 9, 2025

(54) ARCHERY BOW MONITORING

(71) Applicant: Archery Intelligence, LLC, Stamford, CT (US)

(72) Inventors: Jordi Vaquer, Tarragona (ES); Josep Lluis Vaquer, Tarragona (ES); Joan de Magrinya, Tarragona (ES)

(73) Assignee: ARCHERY INTELLIGENCE, LLC, Stamford, CT (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/135,781

(22) Filed: Apr. 18, 2023

(65) Prior Publication Data
US 2023/0251055 A1 Aug. 10, 2023

Related U.S. Application Data

(63) Continuation-in-part of application No. 17/631,295, filed as application No. PCT/US2019/044104 on Jul. 30, 2019, now Pat. No. 11,635,275.

(51) Int. Cl.
*F41B 5/14* (2006.01)
*G01P 1/02* (2006.01)

(52) U.S. Cl.
CPC .......... *F41B 5/1426* (2013.01); *F41B 5/1403* (2013.01); *G01P 1/023* (2013.01)

(58) Field of Classification Search
CPC ......... F41B 5/14; F41B 5/1403; F41B 5/1426
See application file for complete search history.

(56) References Cited

U.S. PATENT DOCUMENTS

| | | | |
|---|---|---|---|
| 7,337,773 B2 | 3/2008 | Simo et al. | |
| 2013/0098344 A1* | 4/2013 | Morris, II | F41B 5/1488 124/90 |
| 2016/0061556 A1* | 3/2016 | Armstrong | F41B 5/1426 124/89 |
| 2016/0161207 A1 | 6/2016 | Donahoe | |
| 2018/0149444 A1 | 5/2018 | Pell | |
| 2018/0172388 A1 | 6/2018 | Haynes et al. | |
| 2020/0333101 A1* | 10/2020 | Bushman | F41B 5/1403 |

* cited by examiner

*Primary Examiner* — Benyam Haile
(74) *Attorney, Agent, or Firm* — Bennet K. Langlotz; Langlotz Patent & Trademark Works, LLC

(57) ABSTRACT

An archery bow comprises a stabilizer mounting facility. A bow element for the archery bow comprises a body. The body comprises a first mounting facility. The first mounting facility is configured for connection to the stabilizer mounting facility. The body comprises a second mounting facility. The second mounting facility is configured for connection to a bow stabilizer. The body includes an accelerometer. The bow element comprises a processor. The processor is connected to the accelerometer. The processor is configured to receive three-dimensional acceleration information from the accelerometer. The processor is operable to generate sampled information based on the three-dimensional acceleration information. The bow element comprises a transmitter. The transmitter is connected to the processor. The transmitter is operable to transmit the sampled information.

14 Claims, 16 Drawing Sheets

1100 ⤹

$$s = \begin{pmatrix} s[1] & s[M-L] & \cdots & s[N_t - 2M + L] & s[N_t - M] \\ s[2] & \ddots & \cdots & & s[N_t] \\ \vdots & & \ddots & \ddots & \vdots \\ s[M-1] & s[2M-L-1] & \cdots & \ddots & s[N_t - 1] \\ s[M] & s[2M-L] & \cdots & s[N_t - M + L] & s[N_t] \end{pmatrix}$$

$$T_f = \frac{1}{\sqrt{M}} \begin{pmatrix} 1 & 1 & 1 & 1 & \cdots & 1 \\ 1 & W & W^2 & W^3 & \cdots & W^{M-1} \\ 1 & W^2 & W^4 & W^6 & \cdots & W^{2(M-1)} \\ 1 & W^3 & W^6 & W^9 & \cdots & W^{3(M-1)} \\ \vdots & \vdots & \vdots & \vdots & \ddots & \vdots \\ 1 & W^{M-1} & W^{2(M-1)} & W^{3(M-1)} & \cdots & W^{(M-1)(M-1)} \end{pmatrix}$$

$$v[n] = (v_x[n], v_y[n], v_z[n]) = \left( \sum_{k=1}^{n} a_x[k] - v_{x0}, \sum_{k=1}^{n} a_y[k] - v_{y0}, \sum_{k=1}^{n} a_z - z0 \right)$$

$$|v[n]| = \sqrt{v_x^2[n] + v_y^2[n] + v_z^2[n]}$$

$$\frac{(E_{kB})}{(E_k)} = \frac{m(|v[n]|^2)_B}{m(|v[n]|^2)} = \frac{(|v[n]|^2)_B}{(|v[n]|^2)}$$

$$A = \begin{pmatrix} a[1] & a[M-L] & \cdots & a[N_t - 2M + L] & a[N_t - M] \\ a[2] & \ddots & \vdots & & a[N_t] \\ \vdots & & \vdots & & \vdots \\ a[M-1] & a[2M-L-1] & \cdots & \ddots & a[N_t - 1] \\ a[M] & a[2M-L] & \cdots & a[N_t - M + L] & a[N_t] \end{pmatrix}$$

FIG. 16

ARCHERY BOW MONITORING

CROSS-REFERENCE TO RELATED APPLICATION

This application is a Continuation-in-Part of U.S. patent application Ser. No. 17/631,295 filed on Jan. 28, 2022, entitled, "ARCHERY BOW MONITORING," which is a National Phase of International Application No.: PCT/US2019/044104, filed Jul. 30, 2019, which are hereby incorporated by reference in their entirety.

FIELD OF THE PRESENT DISCLOSURE

The present disclosure generally relates to archery bows. More particularly, the present disclosure relates to acquiring information on the movements of an archery bow just prior to and during the shot of an archery projectile.

BACKGROUND OF THE PRESENT DISCLOSURE

Many existing archery bows may not be adapted to monitor position and movement immediately before, during, and immediately after the shot of an archery projectile. Many archers may not be given adequate information so that their technique can be improved. Many archers may not be given adequate information to identify loose or damaged components on an archery bow.

Many existing archery bow monitoring systems may rely on accelerometer data in one dimension. Many existing archery bow monitoring systems may comprise accelerometers that become saturated during the shot of an archery projectile. Many existing archery bow monitoring systems may average accelerometer data. Many existing archery bow monitoring systems may produce results based on approximate values.

In archery, a stabilizer is a general term for various types of weights, usually on rods, mounted on the bow to increase stability i.e. lessen movement on release, thereby increasing precision. Stabilizers help reduce inconsistency in the archer's release by increasing the moment of inertia of the bow. If the shooting technique of the archer were perfect, no stabilizers would be required.

Precision comes from repeatability. The reduction of inadvertent movements enhances repeatability. The various types of stabilizers are each designed to minimize a particular direction of movement. These movements are those that may occur between the instant of true aim/string release, and the arrow flying free: not "follow-through" and similar activities, which merely indicate what went before. All weight added to the center section will reduce trembling or shake during the aim, but energy to hold the bow against gravity will obviously increase. Also, the addition of weight will change the shooting characteristics and matching of the arrows to the bow.

What is needed is an improved archery bow monitoring system.

Summary of the Present Disclosure

At least some embodiments of the present disclosure provide a bow element for an archery bow. The archery bow comprises a stabilizer mounting facility. The bow element comprises a body. The body comprises a first mounting facility. The first mounting facility is configured for connection to the stabilizer mounting facility. The body comprises a second mounting facility. The second mounting facility is configured for connection to a bow stabilizer. The body includes an accelerometer. The bow element comprises a processor. The processor is connected to the accelerometer. The processor is configured to receive three-dimensional acceleration information from the accelerometer. The processor is operable to generate sampled information based on the three-dimensional acceleration information. The bow element comprises a transmitter. The transmitter is connected to the processor. The transmitter is operable to transmit the sampled information.

The first mounting facility may be a threaded shaft.

The second mounting facility may be a threaded bore.

The accelerometer may be a tri-axial accelerometer.

The three-dimensional acceleration information may be generated at a rate ranging between 50 and 3200 times per second.

The bow element may include a power source connected to the body.

The transmitter may be a Bluetooth wireless device.

The transmitter may be adapted to transmit a plurality of sequential packets of the sampled information prior to a flight of an archery projectile.

The bow element may include an indicator on the body. The indicator may be operable to visually display a plurality of different statuses.

The indicator may be a multi-color illuminator.

The transmitter may be configured to communicate with a receiver app. The receiver app may be embodied in a receiver mechanically separate from, and operably connected to the transmitter.

The receiver app may be operable to generate a display based on the sampled information.

The receiver app may be adapted to generate resulting information based on the sampled information.

The receiver may include a storage facility including stored data. A receiver processor may be adapted to generate performance information based on the resulting information and based on the stored data.

The bow element may include a capacitive switch on the body.

The accelerometer may be adapted to detect lean of a body axis defined by the first mounting facility and the second mounting facility when the bow element is connected to the archery bow and the archery bow is in a shooting position. During lean, a first end of the body axis is raised or lowered horizontally with respect to a second end of the body axis.

The accelerometer may be adapted to detect tilt of the archery bow axis defined by the length of the archery bow spanning the bow limbs when the bow element is connected to the archery bow and the archery bow is in the shooting position. During tilt, the bow axis is rotated clockwise or counter-clockwise about the body axis.

The accelerometer may be adapted to detect rotation about the bow axis when the bow element is connected to the archery bow and the archery bow is in the shooting position.

At least some embodiments of the present disclosure provide an archery bow. The archery bow comprises a bow body. The bow body has a stabilizer mounting facility. The stabilizer mounting facility is configured for connection to a bow stabilizer. The bow body includes an accelerometer. The accelerometer is proximate the stabilizer mounting facility. The archery bow comprises a processor. The processor is connected to the accelerometer. The processor is configured to receive three-dimensional acceleration information from the accelerometer. The processor is operable to generate sampled information based on the three-dimensional acceleration information. The archery bow comprises a transmitter. The transmitter is connected to the processor. The transmitter is operable to transmit the sampled information.

The stabilizer mounting facility may be a threaded bore.

The archery bow may include a power source connected to the bow body.

The archery bow may include an indicator on the bow body. The indicator may be operable to visually display a plurality of different statuses.

The accelerometer may be adapted to detect lean of a stabilizer axis defined by the stabilizer mounting facility when the archery bow is in a shooting position. During lean, a first end of the stabilizer axis is raised or lowered horizontally with respect to a second end of the stabilizer axis.

The accelerometer may be adapted to detect tilt of the archery bow axis defined by the length of the archery bow spanning the bow limbs when the archery bow is in the shooting position. During tilt, the bow axis is rotated clockwise or counter-clockwise about the stabilizer axis.

The accelerometer may be adapted to detect rotation about the bow axis when the archery bow is in the shooting position.

The archery bow may include a capacitive switch on the bow body.

BRIEF DESCRIPTION OF THE DRAWINGS

FIG. 11 illustrates an example signal slice matrix as employed in various embodiments.

FIG. 12 illustrates an example transformation matrix as employed in various embodiments.

FIG. 13 illustrates an example equation for velocity as employed in various embodiments.

FIG. 14 illustrates an example equation for instantaneous modulus of velocity as employed in various embodiments.

FIG. 15 illustrates an example ratio of kinetic energy as employed in various embodiments.

FIG. 16 illustrates an example acceleration slice matrix as employed in various embodiments.

DETAILED DESCRIPTION

Figure 1:
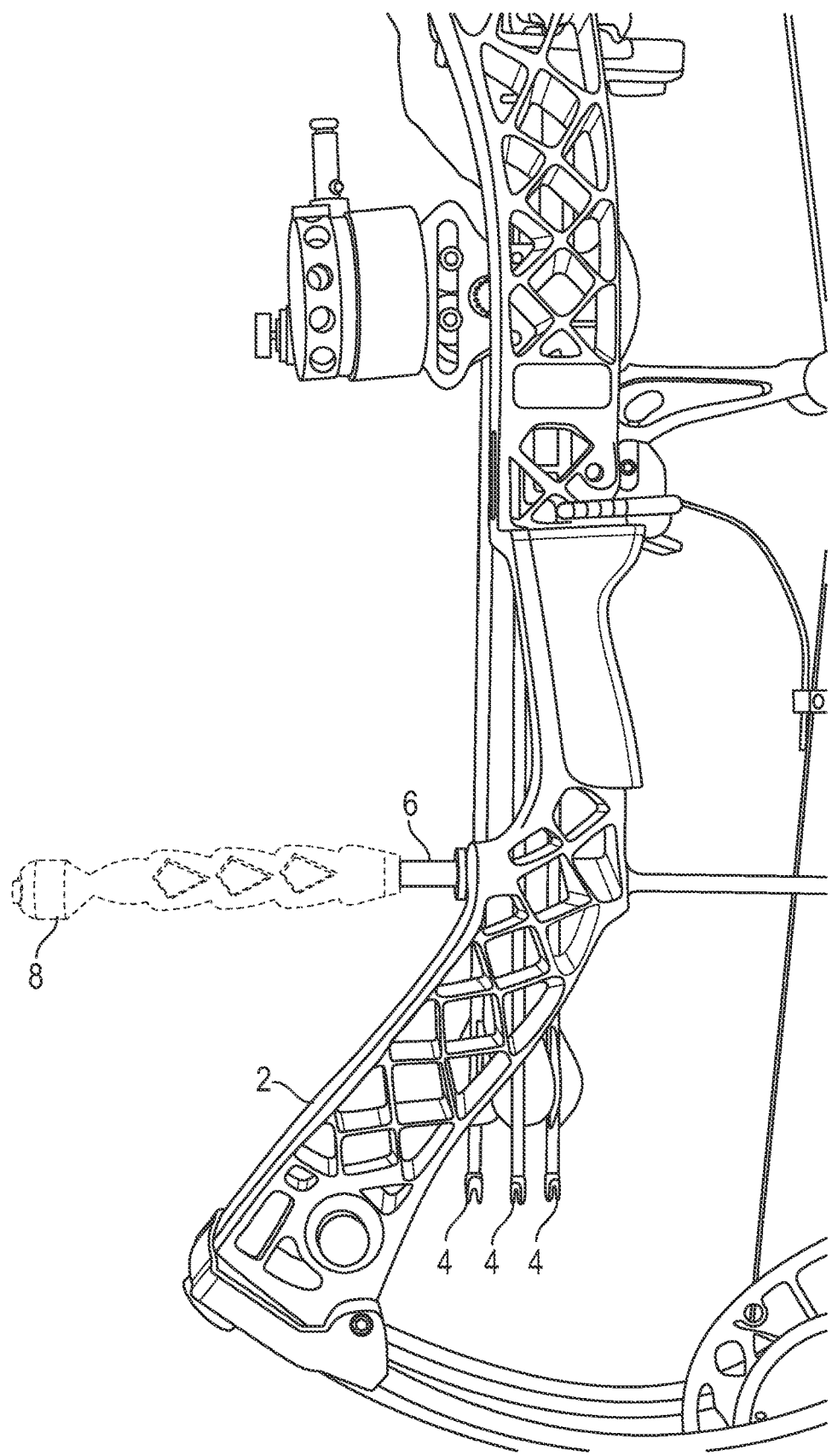
FIG. 1 illustrates an example archery bow with an example bow element and an optional bow stabilizer according to various aspects of an embodiment.

Embodiments of the present disclosure now will be described more fully hereinafter with reference to the accompanying drawings, in which embodiments of the present disclosure are shown. This present disclosure may, however, be embodied in many different forms and should not be construed as limited to the embodiments set forth herein; rather, these embodiments are provided so that this disclosure will be thorough and complete, and will fully convey the scope of the present disclosure.

Certain embodiments of the present disclosure provide a bow element. The bow element may be configured to be connected to an archery bow. The bow element may be configured to be connected to a plurality of archery bows. The bow element may be configured to be connected to a variety of archery bow types.

Certain embodiments of the present disclosure provide an archery bow. For the purposes of this disclosure, archery bows are devices configured to shoot archery projectiles. For the purposes of this disclosure, archery projectiles may include but are not limited to arrows and bolts.

At least some embodiments of the present disclosure provide information related to specific measurements of a bow element and/or an archery bow prior to and during the shot of an archery projectile. Employment of the information may increase the likelihood of improving the accuracy of the archery projectile. Employment of the information may increase the likelihood of increasing the energy transferred from the archery bow to the archery projectile. Employment of the information may increase the likelihood of increasing the kinetic energy of the archery projectile on a target. Knowledge of the information may be employed by archers seeking to understand how their equipment and or technique effects flight dynamics of the archery projectile. Knowledge of the information may be employed by archers seeking to tune their equipment. Knowledge of the information may be employed by archers seeking to understand the fitness of their equipment. Knowledge of the information may be employed by archery equipment manufacturers and/or archery equipment dealers seeking to assist archers in equipment selection, equipment setup, and/or technique adjustments. In the present disclosure, the information may include resulting information and/or performance information.

According to an embodiment, an archery bow may comprise a stabilizer mounting facility. A bow element for the archery bow may comprise a body. The body may comprise a first mounting facility. The first mounting facility may be configured for connection to the stabilizer mounting facility.

The body may comprise a second mounting facility. The second mounting facility may be configured for connection to a bow stabilizer. The first mounting facility may comprise a threaded shaft. The second mounting facility may comprise a threaded bore. The body may be adapted to be removably connected to an archery bow. The body may be adapted to receive a bow stabilizer. The body may be adapted to accept a variety of bow stabilizers.

FIG. 1 illustrates an example archery bow 2 with an example bow element 6 and an optional bow stabilizer 8 according to various aspects of an embodiment. The archery bow 2 may comprise a stabilizer mounting facility. The bow element 6 may comprise a body. The body may comprise a first mounting facility configured for connection to the stabilizer mounting facility. The body may comprise a second mounting facility configured for connection to the bow stabilizer 8. The archery bow 2 may be configured to shoot a plurality of archery projectiles 4.

Figure 2:
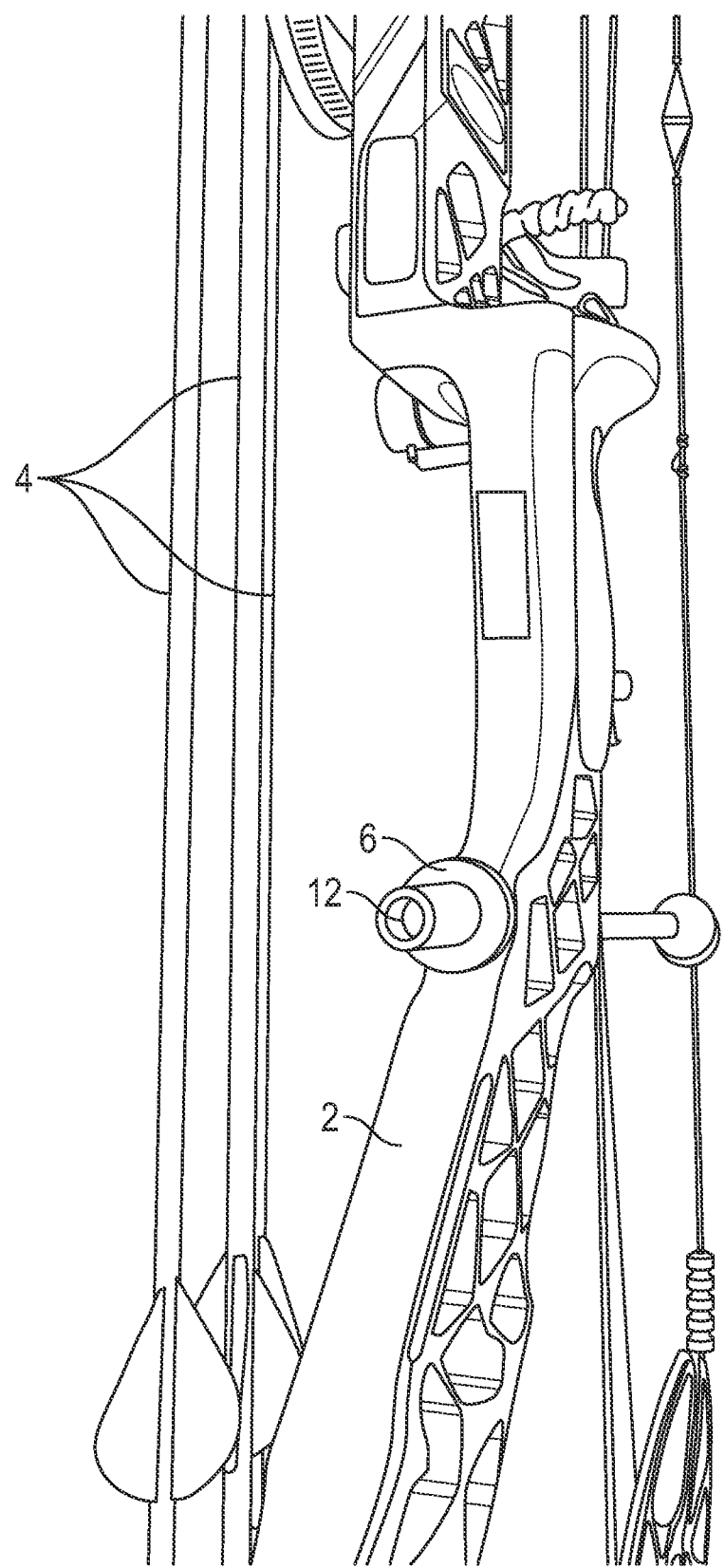
FIG. 2 illustrates an example archery bow with an example bow element according to an aspect of an embodiment.

FIG. 2 illustrates an example archery bow 2 with an example bow element 6 according to an aspect of an embodiment. The archery bow 2 may comprise a stabilizer mounting facility. The bow element 6 may comprise a body. The body may comprise a first mounting facility configured for connection to the stabilizer mounting facility. The body may comprise a second mounting facility 12 configured for connection to a bow stabilizer. The archery bow 2 may be configured to shoot a plurality of archery projectiles 4.

Figure 3:
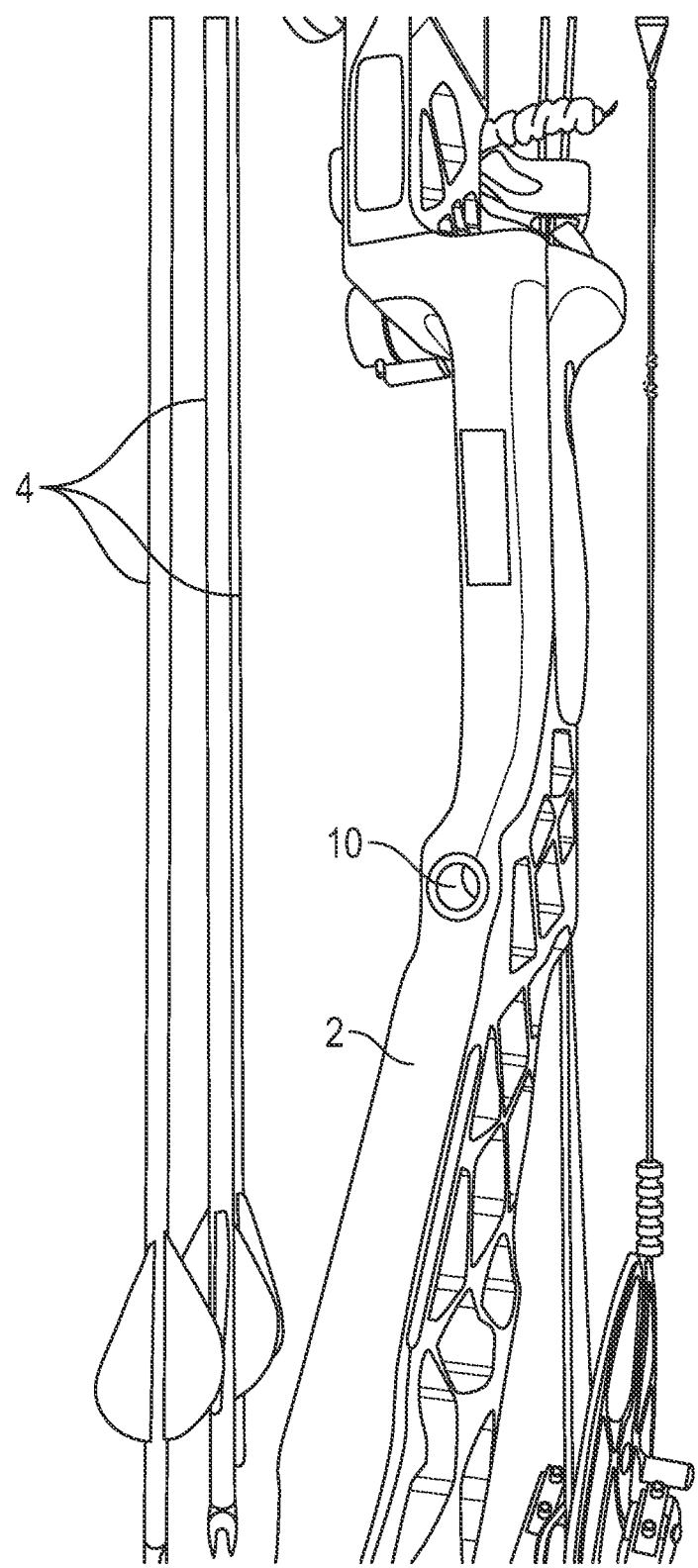
FIG. 3 illustrates an example archery bow with an example stabilizer mounting facility according to an aspect of an embodiment.

FIG. 3 illustrates an example archery bow 2 with an example stabilizer mounting facility 10 according to an aspect of an embodiment. The stabilizer mounting facility 10 may be configured to receive a bow element and/or a bow stabilizer. The archery bow 2 may be configured to shoot a plurality of archery projectiles 4.

According to an embodiment, a bow element may include a power source. The power source may be connected to a body. The power source may comprise a battery. The battery may be rechargeable. The battery may comprise Lithium Ion.

According to an embodiment, an accelerometer may comprise a tri-axial accelerometer. The accelerometer may be operable to generate three-dimensional acceleration information.

According to an embodiment, a bow element may comprise a processor. The processor may be connected to an accelerometer. The processor may be configured to receive three-dimensional acceleration information from the accelerometer. The processor may be operable to generate sampled information based on the three-dimensional acceleration information. The processor may be configured to receive external information from one or more external sensors.

According to an embodiment, a bow element may comprise a transmitter. The transmitter may be connected to a processor. The transmitter may be operable to transmit sampled information. The transmitter may comprise a Bluetooth wireless device. The transmitter may be configured to communicate with a receiver app. The receiver app may be embodied in a receiver mechanically separate from, and operably connected to the transmitter.

According to an embodiment, a bow element may comprise an indicator on a body. The indicator may comprise a multi-color illuminator. The indicator may be operable to visually display a plurality of different statuses. Each of the plurality of different statuses may correspond to one of a plurality of states of the bow element.

According to an embodiment, a bow element may comprise a capacitive switch on a body. The capacitive switch may be configured to power on at least one component of the bow element. The capacitive switch may be configured to power off at least one component of the bow element. The capacitive switch may be configured to activate a pairing state. The capacitive switch may be configured to cycle the bow element through a plurality of states.

According to an embodiment, a body may include a signal designator. The signal designator may be presented or communicated in a variety of ways. Examples include but are not limited to: a barcode, a Quick Reference (QR) code, an alpha-numeric code, a Radio-frequency Identification (RFID) tag, a Near-field Communication (NFC) device, combinations thereof, and/or the like. A distinct signal designator may be included for each of a plurality of bodies so that each of the plurality of bodies may be distinguished from each other.

Figure 4A:
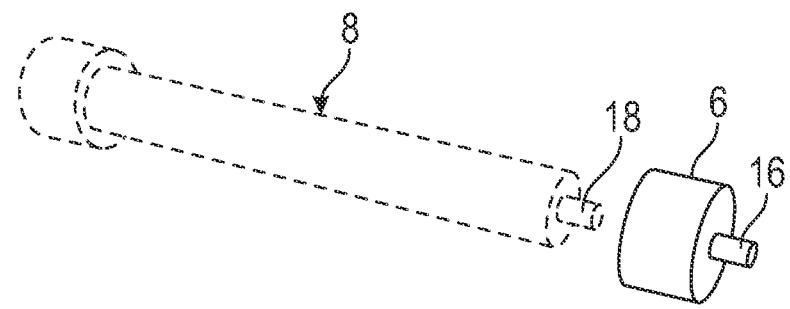
FIGS. 4A and 4B illustrate an example bow element and an optional bow stabilizer according to various aspects of various embodiments.

FIG. 4A illustrates an example bow element 6 and an optional bow stabilizer 8 according to various aspects of an embodiment. The bow element 6 may comprise a body. The body may comprise a first mounting facility 16. The body may comprise a second mounting facility. The second mounting facility may be configured to receive a third mounting facility 18 of the bow stabilizer 8.

Figure 4B:
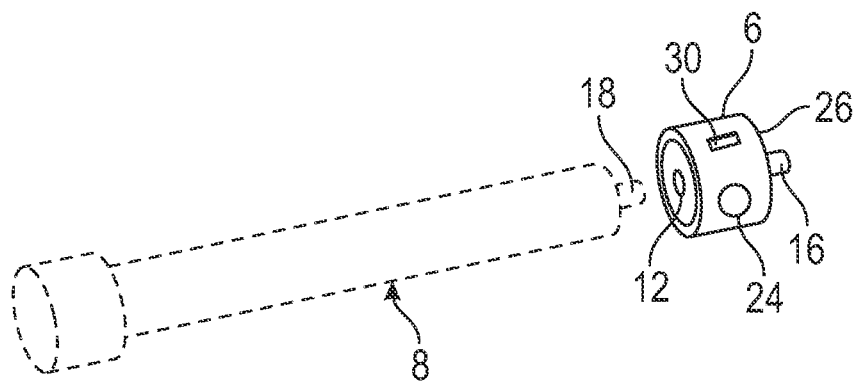

FIG. 4B illustrates an example bow element 6 and an optional bow stabilizer 8 according to various aspects of an embodiment. The bow element 6 may comprise a body 26. The body 26 may comprise a first mounting facility 16. The body 26 may comprise a second mounting facility 12. The second mounting facility 12 may be configured to receive a third mounting facility 18 of the bow stabilizer 8. The bow element 6 may comprise a power supply and accessories interface 30. The power supply and accessories interface 30 may be connected to the body 26. The bow element 6 may comprise a capacitive switch 24. The capacitive switch 24 may be connected to the body 26.

According to an embodiment, an archery bow comprises a bow body. The bow body may comprise a stabilizer mounting facility. The stabilizer mounting facility may be configured for connection to a bow stabilizer. The bow body may comprise an accelerometer. The accelerometer may be proximate the stabilizer mounting facility. The archery bow may comprise a processor. The processor may be connected to the accelerometer. The processor may be configured to receive three-dimensional acceleration information from the accelerometer. The processor may be operable to generate sampled information based on the three-dimensional acceleration information. The archery bow may comprise a transmitter. The transmitter may be connected to the processor. The transmitter may be operable to transmit the sampled information.

According to an embodiment, an archery bow may include a power source. The power source may be connected to a bow body.

According to an embodiment, an archery bow may comprise a processor.

According to an embodiment, an archery bow may comprise a transmitter.

According to an embodiment, an archery bow may comprise an indicator on a bow body. The indicator may comprise a multi-color illuminator. The indicator may be operable to visually display a plurality of different statuses. Each of the plurality of different statuses may correspond to one of a plurality of states of the archery bow.

According to an embodiment, an archery bow may comprise a capacitive switch on a bow body. The capacitive switch may be configured to power on at least one component of the archery bow. The capacitive switch may be configured to power off at least one component of the archery bow. The capacitive switch may be configured to cycle the archery bow through a plurality of states.

According to an embodiment, an archery bow may include a signal designator.

Figure 5:
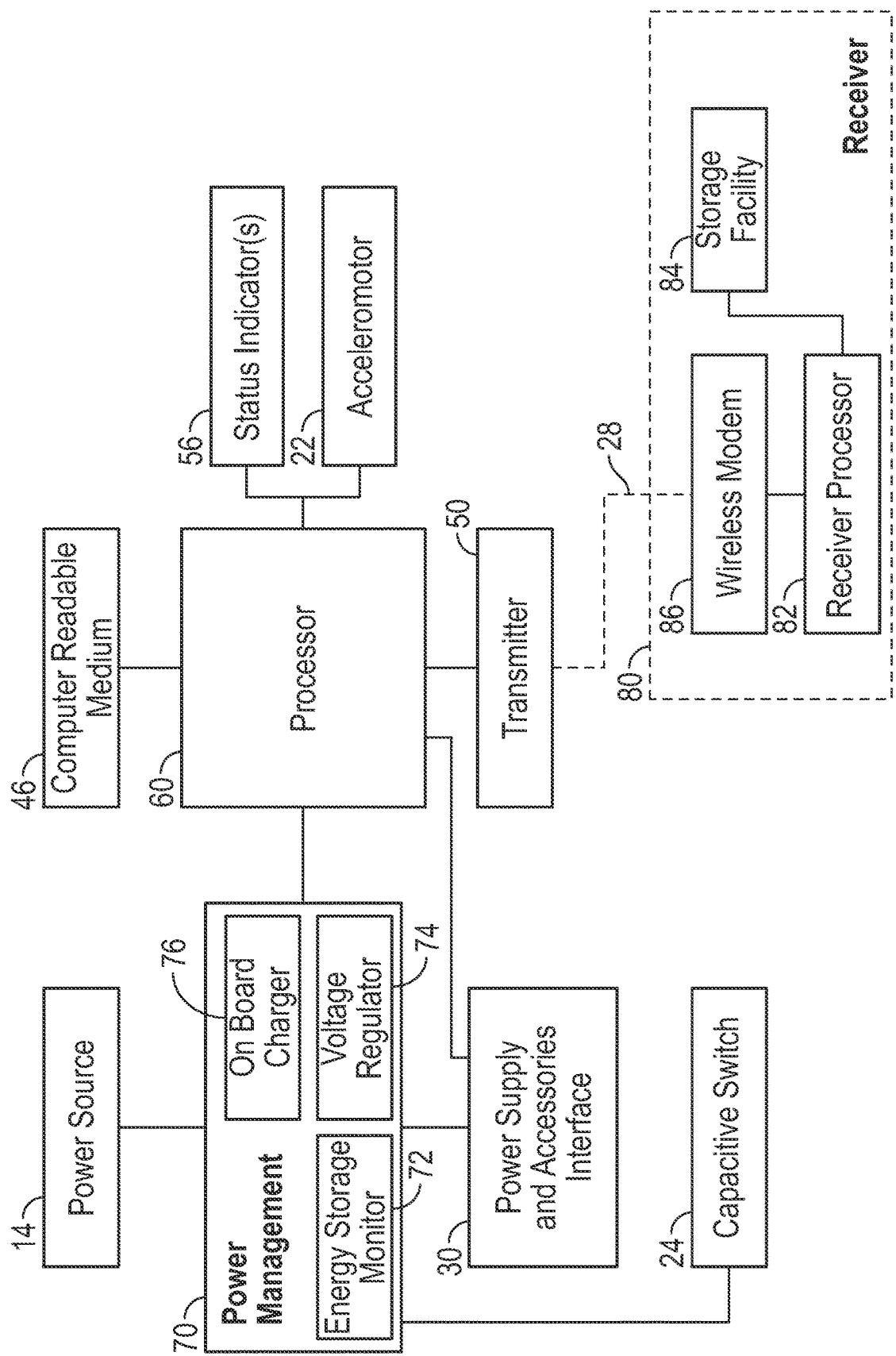
FIG. 5 is a block diagram showing example components of an example bow element and/or an example archery bow as per various aspects of various embodiments.

FIG. 5 is a block diagram showing example components of an example bow element (e.g. 6) and/or an example archery bow (e.g. 2) as per various aspects of various embodiments.

According to an embodiment, a power source 14 may be in electrical communication with a power management facility 70. The power management facility 70 may comprise an energy storage monitor 72. The power management facility 70 may comprise a voltage regulator 74. The power management facility 70 may comprise an on board charger 76. The power source 14 may be in electrical communication with a processor 60. The power source 14 may be in electrical communication with the processor 60 through the power management facility 70.

According to an embodiment, a power supply and accessories interface 30 may be adapted to connect to a remote charger. The remote charger may comprise a wireless charge coil. The power supply and accessories interface 30 may comprise a USB port, a DC socket, a Lightning port, combinations thereof, and/or the like.

According to an embodiment, an accelerometer 22 may comprise at least one digital Microelectromechanical Systems (MEMS) accelerometer. The accelerometer 22 may be operable to generate three-dimensional acceleration information at a rate ranging between 50 and 3200 times per second. The rate may be corrected based on the timing of a processor 60. The accelerometer 22 may have an X axis aligned with an axis defined by a body. The body may be adapted to align with an axis defined by a stabilizer mounting facility.

According to an embodiment, one or more indicators 56 may be in communication with a processor 60. The one or more indicators 56 may be adapted to correspond to a plurality of states. The one or more indicators 56 may be presented through employment of at least one LED.

According to an embodiment, a computer readable medium 46 may be in communication with a processor 60.

According to an embodiment, a transmitter 50 may be in communication with a processor 60.

According to an embodiment, a receiver 80 may comprise a wireless modem 86. The wireless modem 86 may be adapted to communicate with a transmitter 50 over a network 28. The network 28 may, for example, comprise a Bluetooth connection, a ZigBee connection, a Wi-Fi network, or the like. The receiver 80 may comprise a receiver processor 82. The receiver processor 82 may be in communication with the wireless modem 86. The receiver may comprise a storage facility 84. The storage facility 84 may be in communication with the receiver processor 82.

According to an embodiment, a capacitive switch 24 may be in communication with a power management facility 70. The capacitive switch 24 may be in electrical communication with a processor 60. The capacitive switch 24 may be in electrical communication with the processor 60 through the power management facility 70.

Figure 6A:
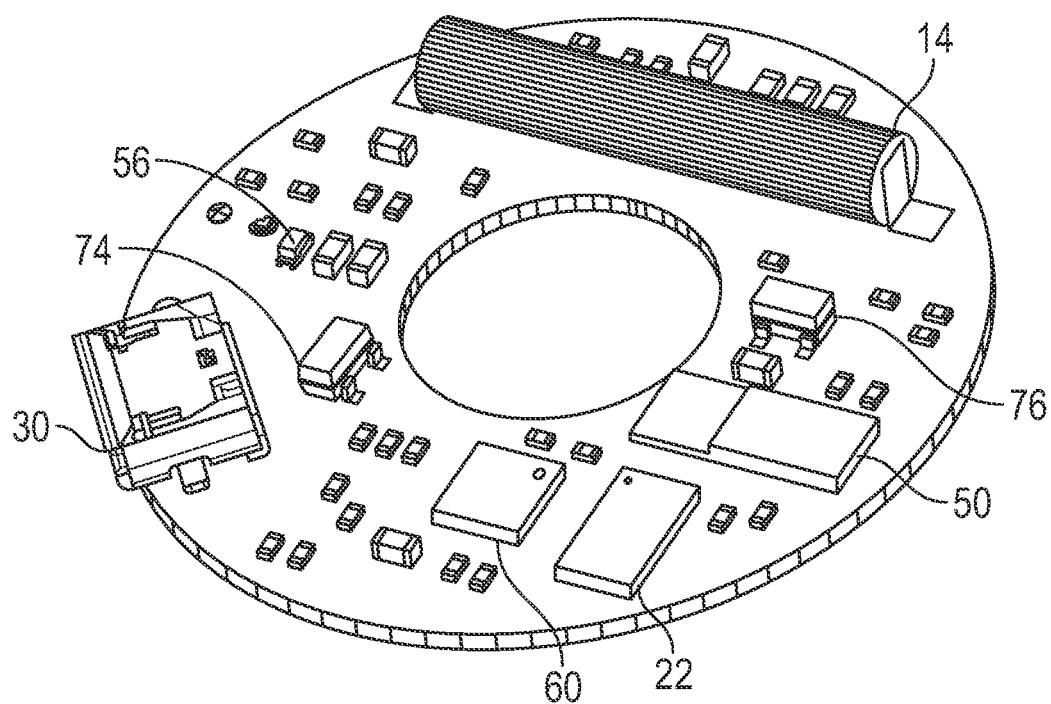
FIGS. 6A and 6B schematically illustrate example components of an example bow element and/or an example archery bow as per various aspects of various embodiments.
Figure 6B:
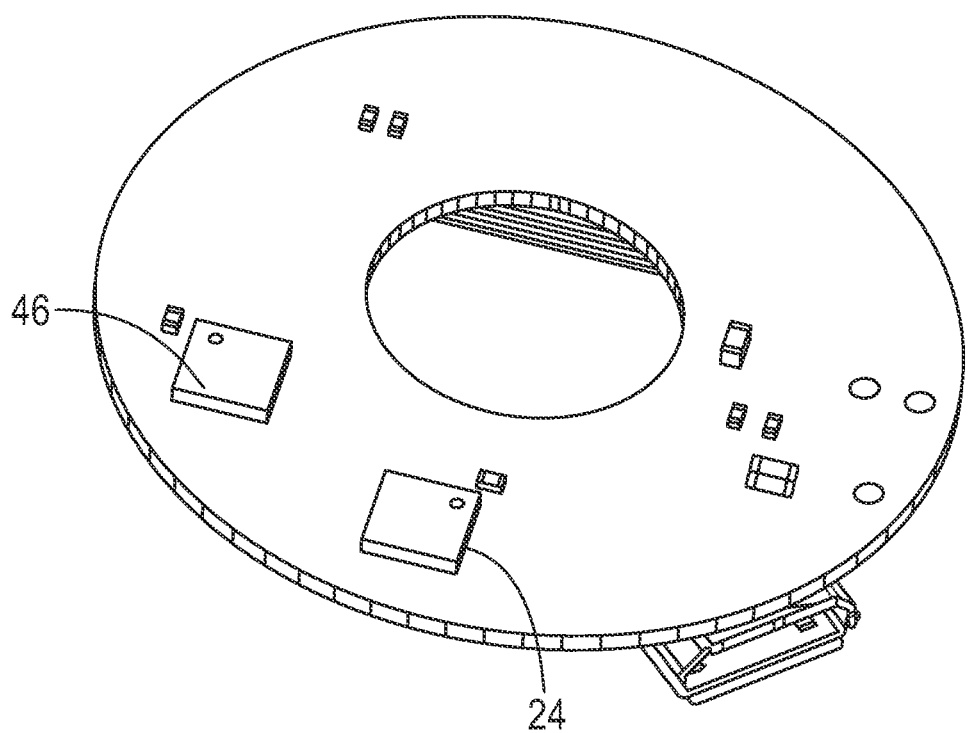

FIGS. 6A and 6B schematically illustrate example components of an example bow element (e.g. 6) and/or an example archery bow (e.g. 2) as per various aspect of various embodiments. The bow element (e.g. 6) and/or an archery bow (e.g. 2) may comprise a printed circuit board. The printed circuit board may comprise a plurality of layers.

According to an embodiment, a printed circuit board may comprise a power source 14. The printed circuit board may comprise at least one LED 56. The printed circuit board may comprise a processor 60. The printed circuit board may comprise a computer readable medium 46. The computer readable medium may comprise instructions. The computer readable medium may be adapted to store information generated by an accelerometer 22, an energy storage monitor (e.g. 72), the processor 60, combinations thereof, and/or the like. The printed circuit board may comprise a transmitter 50. The printed circuit board may comprise an antenna. The antenna may be in electrical communication with the transmitter 50. The printed circuit board may comprise a power supply and accessories interface 30. The printed circuit board may comprise a power management facility (e.g. 70). The power management facility (e.g. 70) may comprise a charger 76. The power management facility 70 may comprise a voltage regulator 74. The printed circuit board may comprise a capacitive switch 24.

According to an embodiment, a bow element and/or an archery bow may be adapted to recognize a plurality of states. The plurality of states may include imperfect lean. Imperfect lean may also be referred to as arm drop. Imperfect lean may occur when a lean angle is greater than a lean threshold. The lean threshold may comprise, for example, one degree from vertical. The plurality of states may include imperfect tilt. Imperfect tilt may occur when a tilt angle is greater than a tilt threshold. The tilt threshold may comprise, for example, one degree from vertical. The plurality of states may include a rotation about a vertical axis. Rotation may occur when a bow element and/or an archery bow is rotated during a shot. Rotation may occur when a rotation angle is greater than a rotation threshold. The rotation threshold may comprise, for example, one degree. The rotation may comprise a positive number for rotation in a first direction. The rotation may comprise a negative number for rotation in a second direction.

According to an embodiment, an indicator may be operable to visually display a ready status during a ready state. For example, the ready status may comprise a solid green light. A state may be based on real-time sampled information. A state may be based on sampled information from a previous shot. The indicator may be operable to visually display a not ready status if an imperfect lean and/or imperfect tilt state is detected. For example, a not ready status may comprise a solid red light. The indicator may be operable to visually display a warning status if abnormal vibrations were detected on the previous shot. For example, a warning status may comprise a flashing red light. The indicator may be operable to visually display a low battery status. The indicator may be operable to visually display a fully charged status. The indicator may be operable to visually display a paired status. The indicator may be operable to visually display a disconnected status.

Figure 7:
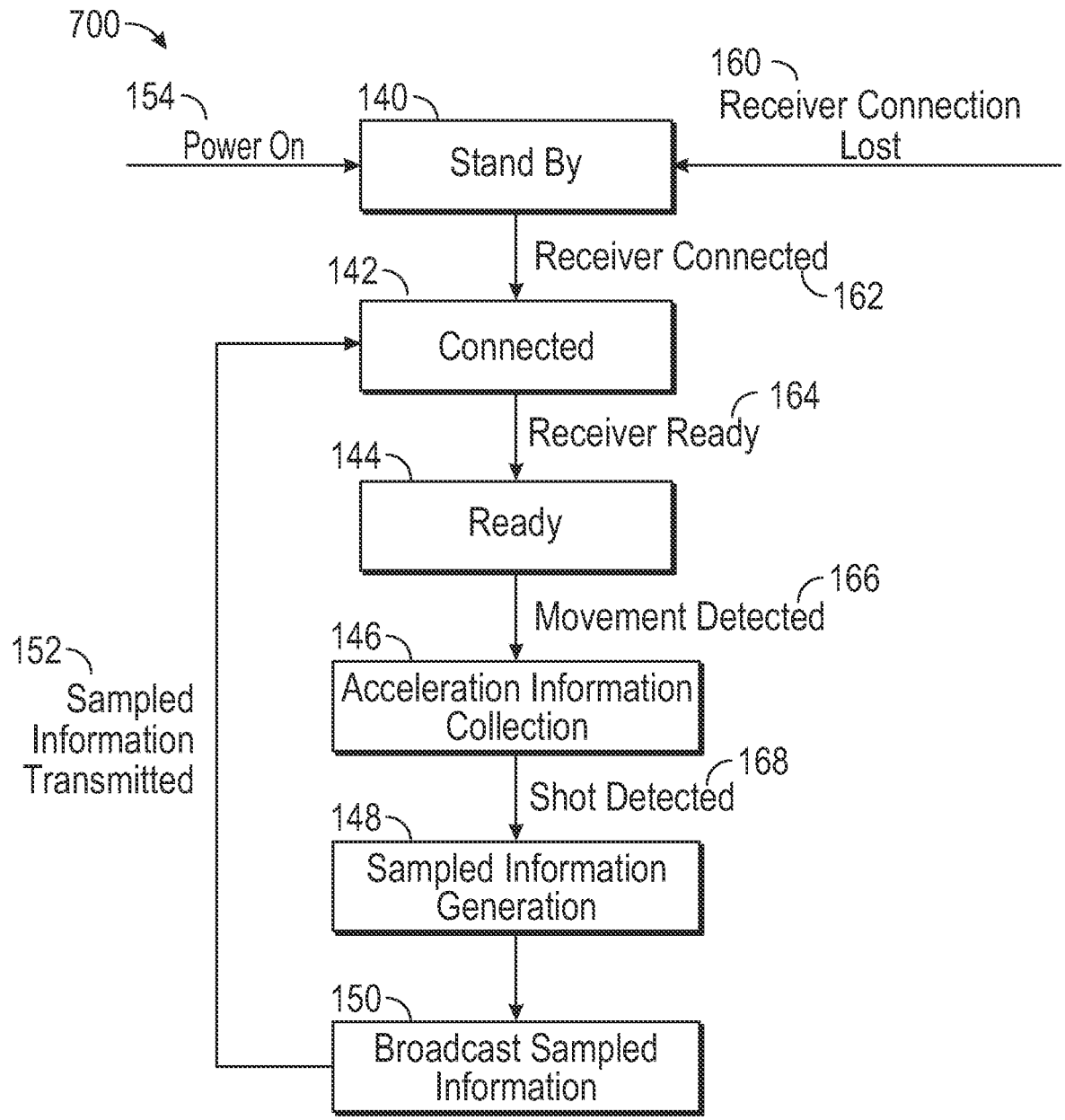
FIG. 7 is a state diagram for an example bow element and/or an example archery bow as per an aspect of various embodiments.

FIG. 7 is a state diagram for an example bow element and/or an example archery bow as per an aspect of various embodiments. The bow element and/or an archery bow may comprise a body 700. The body 700 may be a bow body. Upon a power on at 154, the body 700 may be operable to stand by at 140. Upon a receiver being wirelessly connected at 162, the body 700 may be operable to be connected at 142. Upon a receiver ready indication at 164, the body 700 may be operable to be ready at 144. Upon body movement being detected at 166, the body 700 may enter into acceleration information collection at 146. Upon a shot being detected at 168, the body 700 may be operable to enter sampled information generation at 148. After sampled information is generated at 148, the body 700 may be operable to broadcast sampled information at 150. Once sampled information has been transmitted at 152, the body 700 may be operable to return to connected at 142. At any time during operation, if receiver connection is lost at 160, the body 700 may be operable to return to stand by at 140.

According to an embodiment, a processor may be adapted to process three-dimensional acceleration information to generate sampled information. Processing the three-dimensional acceleration information may comprise multiplying the three-dimensional acceleration information by the standard gravity g. Processing the three-dimensional acceleration information may comprise multiplying the three-dimensional acceleration information by the range of the corresponding accelerometer. Processing the three-dimensional acceleration information may comprise dividing the three-dimensional acceleration information by 2 to the power of the number of bits of the corresponding accelerometer. Processing the three-dimensional acceleration information may comprise applying a FIR filter to X axis acceleration components. The FIR filter may employ windowing. Examples of windowing include the Hanning Window, the Hamming Window, and the Blackman window.

According to an embodiment, a transmitter may be operably connected to a processor to broadcast sampled information. The transmitter may be adapted to transmit a plurality of sequential packets of the sampled information. The transmitter may be adapted to transmit at least a portion of the sampled information before the shot of an archery projectile has been detected. The transmitter may be adapted to transmit at least a portion of the sampled information after the shot of the archery projectile has been detected.

According to an embodiment, a receiver may comprise a receiver processor. The receiver processor may be adapted to generate resulting information based on sampled information. A receiver app may be operable to generate a display based on the resulting information.

According to an embodiment, resulting information may include position information. The position information may comprise bow tilt information, bow lean information, bow rotation information, combinations thereof, and/or the like. For the purposes of this disclosure, vertical position may be relative to bow tilt and/or bow lean. Arm drop is an example of bow lean. Bow tilt may also be referred to as bow roll. Bow lean may also be referred to as bow pitch. Bow rotation may also be referred to as bow yaw. An example of bow rotation occurs when the bow body, the string, and the point of aim are not in alignment. Archer posture may be based on bow tilt information, bow lean information, bow rotation information, combinations thereof, and/or the like. The resulting information may include grip information. The resulting information may include release information. The resulting information may include bow vibration information. The bow vibration information may comprise natural vibrations and/or abnormal vibrations. Natural vibrations may comprise recurrent vibrations. Abnormal vibrations may be caused by, for example, a loose screw and/or a damaged cam. The vibration information may comprise vibration amplitude, frequency, duration, combinations thereof, and/or the like. Vibration information from a shot may be compared to vibration information from one or more previous shots.

Figure 8A:
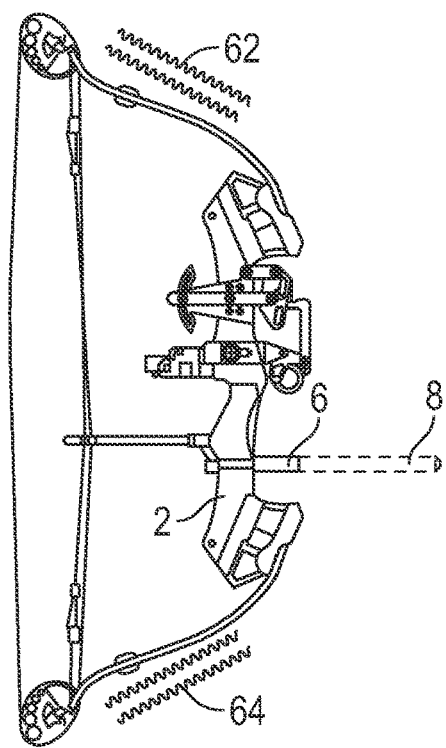
FIGS. 8A and 8B illustrate example vibrations of an example archery bow according to various aspects of an embodiment.
Figure 8B:
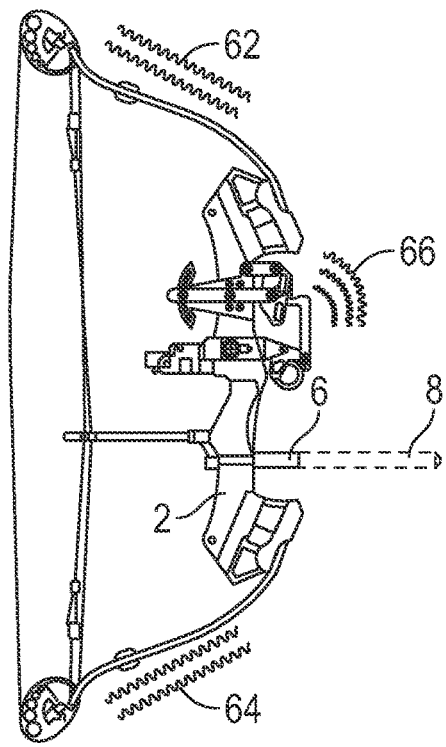

FIGS. 8A and 8B illustrate example vibrations of an example archery bow 2 according to various aspects of an embodiment. A bow element 6 may be threadably connected to a the archery bow 2. A bow stabilizer 8 may be threadably connected to the bow element 6. During and/or immediately following a shot, the bow element 6 may be adapted to detect natural vibrations (62 and 64). During and/or immediately following a shot, the bow element 6 may be adapted to detect abnormal vibrations 66.

Figure 9C:
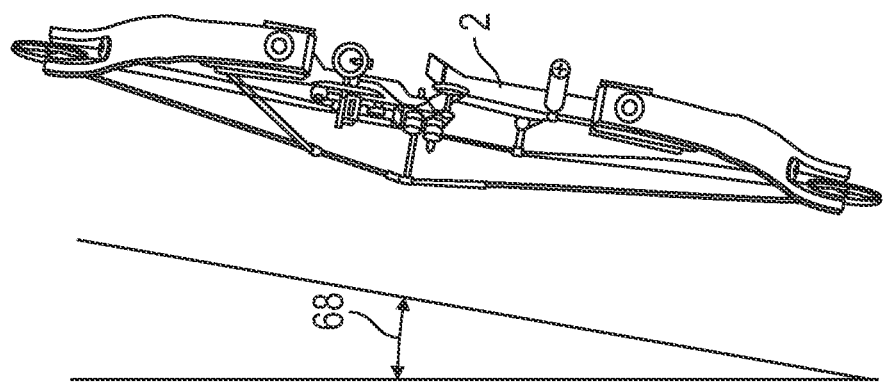
FIGS. 9A, 9B, and 9C illustrate example tilt angles of an example archery bow according to various aspects of an embodiment.
Figure 9B:
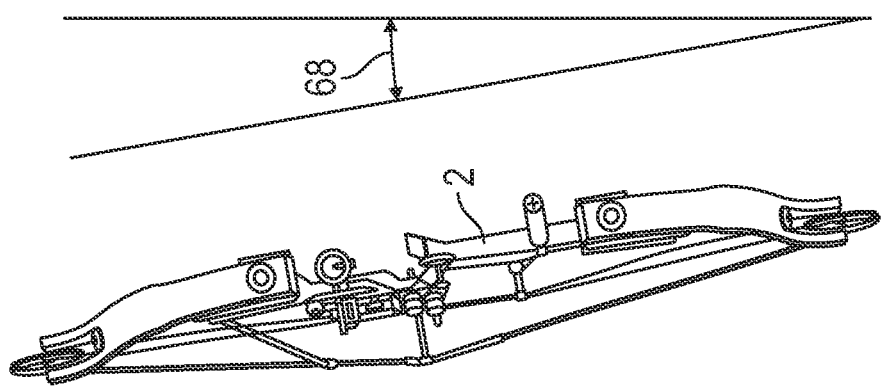
Figure 9A:
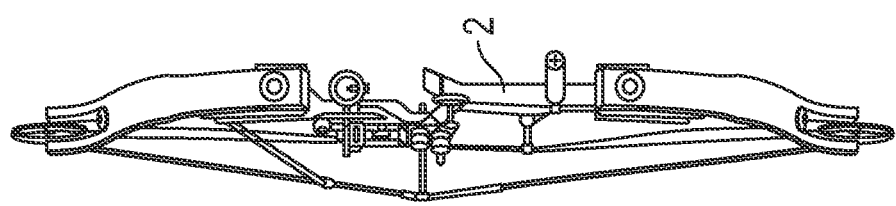

FIGS. 9A, 9B, and 9C illustrate example tilt angles of an example archery bow 2 according to various aspects of an embodiment. FIG. 9A illustrates the archery bow 2 at a tilt angle of zero degrees. FIG. 9B illustrates the archery bow 2 at a tilt angle 68. The tilt angle may be a positive value. The tilt angle may be a negative value. The tilt angle may specify right or left. FIG. 9C illustrates the archery bow 2 at a tilt angle 68.

Figure 10:
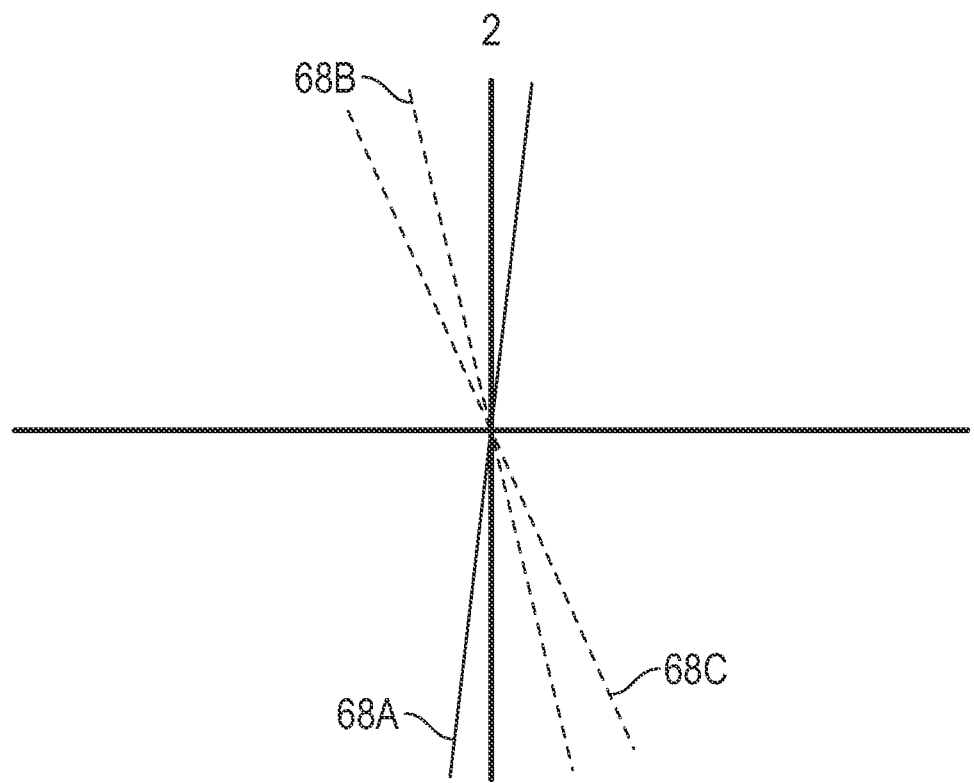
FIG. 10 illustrates example tilt angles of an example archery bow according to various aspects of an embodiment.

FIG. 10 illustrates example tilt angles of an example archery bow 2 according to various aspects of an embodiment. During and/or immediately following a shot, the archery bow 2 may experience a first tilt angle 68A, a second tilt angle 68B, a third tilt angle 68C, combinations thereof, and/or the like. The tilt angle may be a positive value. The tilt angle may be a negative value. The tilt angle may specify right or left.

According to an embodiment, an archery projectile may comprise an archery projectile facility. The archery projectile facility may have at least one projectile accelerometer. The at least one projectile accelerometer may be operable to generate projectile acceleration information. The projectile acceleration information may be three-dimensional acceleration information. The three-dimensional acceleration information may comprise instantaneous acceleration along a X axis. The three-dimensional acceleration information may comprise instantaneous acceleration along a Y axis. The three-dimensional acceleration information may comprise instantaneous acceleration along a Z axis. The archery projectile facility may have a projectile processor operably connected to the at least one projectile accelerometer. The projectile processor may be adapted to process the projectile acceleration information to generate projectile sampled information. The archery projectile facility may have a projectile transmitter operably connected to the projectile processor. The projectile transmitter may be adapted to transmit the projectile sampled information. The projectile transmitter may be adapted to transmit a plurality of sequential packets of the projectile sampled information during a flight of the archery projectile. The projectile transmitter may be adapted to transmit at least a portion of the projectile sampled information after an impact with a target has been detected. A receiver may be adapted to receive the projectile sampled information. The receiver may include a receiver processor adapted to generate resulting information based on the projectile sampled information.

According to an embodiment, at least one projectile accelerometer may be a three-axis transducer. The at least one projectile accelerometer may be adapted to detect cyclical flexure of an elongated arrow shaft. The at least one projectile accelerometer may be adapted to detect rotation (commonly referred to as spin) of the archery projectile about a body axis defined by the elongated arrow shaft. The at least one projectile accelerometer may be adapted to detect wobble of the elongated arrow shaft. The at least one projectile accelerometer may be adapted to detect fishtailing of the elongated arrow shaft. The at least one projectile accelerometer may be operable to generate three-dimensional acceleration information. The three-dimensional acceleration information may be generated at a rate ranging between 50 and 3200 times per second.

According to an embodiment, processing projectile acceleration information may comprise multiplying the projectile acceleration information by the standard gravity g. Processing the projectile acceleration information may comprise multiplying the projectile acceleration information by the range of a corresponding projectile accelerometer. Processing the projectile acceleration information may comprise dividing the projectile acceleration information by 2 to the power of the number of bits of the corresponding projectile accelerometer. Processing the projectile acceleration information may comprise applying a FIR filter to X axis acceleration components. The FIR filter may employ windowing. Examples of windowing include the Hanning Window, the Hamming Window, and the Blackman window. The FIR filter may, for example, comprise an order of 33. The FIR filter may, for example, comprise a cutoff frequency of 20 Hz.

According to an embodiment, resulting information may include velocity information. The velocity information may comprise an average velocity of an archery projectile during at least a portion of flight. The velocity information may comprise a maximum velocity. The velocity information may comprise a minimum velocity. The velocity information may comprise a velocity just prior to detection of an impact. The velocity information may comprise velocity at a specific time during flight. The velocity information may comprise velocity at a specific distance during flight. The resulting information may include distance information. The distance information may comprise a distance travelled by the archery projectile during flight. The resulting information may include angle information. The angle information may comprise an angle of the archery projectile during a shot. The angle information may comprise an angle of the archery projectile during at least a portion of flight. The angle information may comprise an angle of the archery projectile after impact. The resulting information may be based on a determination of a stabilization point of the archery projectile. The resulting information may include a time interval until the archery projectile reaches the stabilization point. The resulting information may include a flight distance until the archery projectile reaches the stabilization point. The resulting information may include a trauma score. The trauma score may be based on a loss of kinetic energy prior to the archery projectile reaching the stabilization point. The resulting information may include a flight score.

According to an embodiment, a receiver processor may be adapted to generate a first set of resulting information reflecting projectile sampled information over a first time period of flight. The first set of resulting information may be generated for projectile sampled information prior to reaching a stabilization point. The receiver processor may be adapted to generate a second set of resulting information reflecting projectile sampled information over a second time period of flight. The second set of resulting information may be generated for projectile sampled information after reaching the stabilization point. The first set of resulting information may be distinct from the second set of resulting information.

According to an embodiment, a receiver may include a storage facility. The receiver may be configured to communicate with the storage facility through employment of a data network (for example, the Internet and/or a Local Area Network). The storage facility may include stored data. A receiver processor may be adapted to generate performance information. The performance information may be based on resulting information. The performance information may be based on the stored data. The stored data may include bow mass for a plurality of archery bows. The stored data may include bow length for a plurality of archery bows. The stored data may include bow power for a plurality of archery bows. The stored data may include expected recurring bow vibrations for a plurality of archery bows. Recurring bow vibrations may be based on one or more resonant frequencies of an archery bow. The stored data may include stabilizer mass for a plurality of stabilizers. The stored data may include stabilizer length for a plurality of stabilizers. The stored data may include one or more stabilizer materials for a plurality of stabilizers.

According to an embodiment, performance information may correlate vibration information with stabilizer mass, stabilizer length, one or more stabilizer materials, combinations thereof, and/or the like.

According to an embodiment, performance information may include bow efficiency information. Bow efficiency may be based on the amount of energy transferred from the archery bow to an archery projectile. The bow efficiency may be based on a magnitude and/or duration of acceleration during a shot burst. A shot burst may include a time interval surrounding the shot of the archery projectile.

According to an embodiment, performance information may include bow fitness information. The bow fitness information may be based on vibration information. The bow fitness information may be based on a vibration baseline and/or expected vibration information.

According to an embodiment, stored data may include arrow shaft mass for a plurality of arrow shafts. The stored data may include arrow spine rating for a plurality of arrow shafts. The stored data may include arrow shaft diameter for a plurality of arrow shafts. The stored data may include fletching mass for a plurality of fletchings. The stored data may include a plurality of fletching turn arrangements. The stored data may include a plurality of fletching lengths. The stored data may include a plurality of fletching heights. The stored data may include arrow tip mass for a plurality of arrow tips and/or broadheads. The stored data may include a blade count for a plurality of broadheads. The stored data may include blade size for a plurality of broadheads.

According to an embodiment, performance information may include kinetic energy of an archery projectile delivered to a target. The performance information may include kinetic energy at a specific time during flight. The performance information may include kinetic energy at a specific distance during flight. The performance information may include ballistic information. The performance information may include a ballistic curve. The ballistic curve may be three dimensional. The performance information may include momentum delivered to a target. The performance information may include momentum at a specific time during flight. The performance information may include momentum at a specific distance during flight. The performance information may include impact on target. The impact on target may be expressed in pounds of force per square inch. The performance information may include a flight score. The flight score may comprise a ratio of kinetic energy lost to the total kinetic energy delivered during the shot. The kinetic energy lost may be calculated immediately following the shot of the archery projectile. The kinetic energy lost may be calculated at or near a stabilization point. The flight score may be expressed as a percentage or a fraction. The flight score may be expressed as a rating in a range of 0 to 10.

According to an embodiment, sampled information may be based on three-dimensional acceleration information. The three-dimensional acceleration information may comprise instantaneous acceleration in each of X, Y, and Z planes. Resulting information may be based on the sampled information. At least a portion of the resulting information may be based on determination of a stabilization point during a flight of an archery projectile. The stabilization point may be based on the projectile sampled information.

According to an embodiment, instantaneous acceleration may be extracted from sampled information and/or projectile sampled information. For example, instantaneous acceleration in X, Y, Z a $[n]=(a_x[n], a_y[n], a_z[n])$, where $n \in (1,2,3, \ldots, N_{t-1}, N_t)$ is a sample of time, and $N_t$ is the total number of samples included in a shot of an archery projectile.

According to an embodiment, YZ acceleration may be converted into a complex number. For example, $s[n]=a_y[n]+j \cdot a_z[n]$ or $s[n]=a_z[n]+j \cdot a_y[n]$, where j is the square root of -1. The signal s[n] may be sliced into small time intervals. The small time intervals may have overlap between them. A first small time interval may include a shot burst. A second small time interval may include vibrations occurring after the shot is complete. The slices may be expressed in a signal slice matrix.

FIG. 11 illustrates an example signal slice matrix 1100 as employed in various embodiments. S represents the signal slice matrix of s[n] where M<$N_t$, $N_t$ is the number of samples per slice, L<M, and M is the number of samples considered for overlapping.

According to an embodiment, a transform may be applied to each of a plurality of slices of a signal. The transform may comprise a discrete Fourier transform (DFT). For example, a DFT may be applied to each of the plurality of slices in signal slice matrix S (e.g. 1100) to generate a signal slice transform matrix $S_F=T_f \cdot S$, where $T_f$ is a transformation matrix.

FIG. 12 illustrates an example transformation matrix 1200 as employed in various embodiments. $T_f$ represents the transformation matrix where $w=\exp(-j2\pi/M)$. For example, when $T_f$ is applied to a signal slice matrix S (e.g. 1100), each column of a resulting signal slice transform matrix Sp contains the M point Fourier transform of s[n] within a period of M samples and an overlap of L samples. $N_t$, the total number of samples, may be divisible by M, the number of samples considered for overlapping. M, may be divisible by L.

According to an embodiment, the power of a signal slice transform matrix $S_F$ may be represented in logarithmic scale as $P_{SF}=20 \log|S_F|$.

According to an embodiment, a frequency threshold may be applied to a signal slice transform matrix $S_F$. The frequency threshold may be employed to determine which slices of signal slice transform matrix Sp correspond to slices during a shot burst. The frequency threshold may be employed to determine which slices of signal slice transform matrix $S_F$ correspond to slices after a shot burst. Since a first period during a shot burst is expected to have high vibrations, the first period may be determined for slices above the power threshold. Since a second period after the shot burst is expected to have one dominant frequency, the second period may be determined for slices below the power threshold. The end of the first period may correspond to a time interval of the shot burst.

According to an embodiment, kinetic energy of an archery projectile may be determined for a first period of flight after shot. The kinetic energy may be based on an instantaneous modulus of velocity. The instantaneous modulus of velocity may be based on the velocity of the archery projectile.

FIG. 13 illustrates an example equation 1300 for velocity as employed in various embodiments. v[n] represents velocity where $v_{x0}$, $v_{y0}$ and $v_{z0}$ are constant values so that the final value of the velocity after the shoot is adjusted to 0.

FIG. 14 illustrates an example equation 1400 for instantaneous modulus of velocity as employed in various embodiments. |v[n]| represents the instantaneous modulus of velocity.

FIG. 15 illustrates an example ratio 1500 of kinetic energy as employed in various embodiments. The ratio 1500 of kinetic energy may be employed to calculate the kinetic energy transferred from an archery bow during a shot burst to an archery projectile immediately following the shot. The kinetic energy may be represented as Ex $[n]=m|v[n]|^2$ where m is the mass. Therefore, the ratio 1500 may be employed to calculate the kinetic energy applied by the archery bow over the kinetic energy received by the archery projectile.

According to an embodiment, instantaneous acceleration in XYZ a [n] may be extracted from sampled information. The instantaneous acceleration signal a [n] may be sliced into small time intervals. The small time intervals may have overlap between them. The slices may be expressed in an acceleration slice matrix.

FIG. 16 illustrates an example acceleration slice matrix 1600 as employed in various embodiments. A represents the acceleration slice matrix of a[n] where M<$N_t$, $N_t$ is the number of samples per slice, L<M, and M is the number of samples considered for overlapping.

According to an embodiment, a transform may be applied to each of a plurality of slices of a signal. The transform may comprise a discrete Karhunen-Loève transform (KLT). For example, a KLT may be applied to each column of slices in acceleration slice matrix A (e.g. 1600). A KLT may be performed by calculating a covariance matrix of each column of acceleration slice matrix A (e.g. 1600) and diagonalizing it. A dot product may be processed between resulting eigenvectors and the input slices. A KLT Matrix $A_{KLT}$ may be generated by applying the KLT to each column of slices in acceleration slice matrix A (e.g. 1600), where each column contains the M point KLT of a[n] within a period of M samples, and an overlap of L samples. $N_t$, the total number of samples, may be divisible by M, the number of samples considered for overlapping. M, may be divisible by L.

According to an embodiment, the power of a KLT Matrix $A_{KLT}$ may be represented in logarithmic scale as $P_{AK}=20 \log|A_{KLT}|$.

According to an embodiment, a power threshold may be applied to a normalized power of KLT Matrix $A_{KLT}$ to determine a shot burst. Since a first period during the shot burst is expected to have high vibrations, the first period may be determined for slices above the power threshold. Since a second period after the shot burst is expected to have one dominant frequency, the second period may be determined for slices below the power threshold. The end of the first period of flight may correspond to a time interval including the shot burst.

Figure 17:
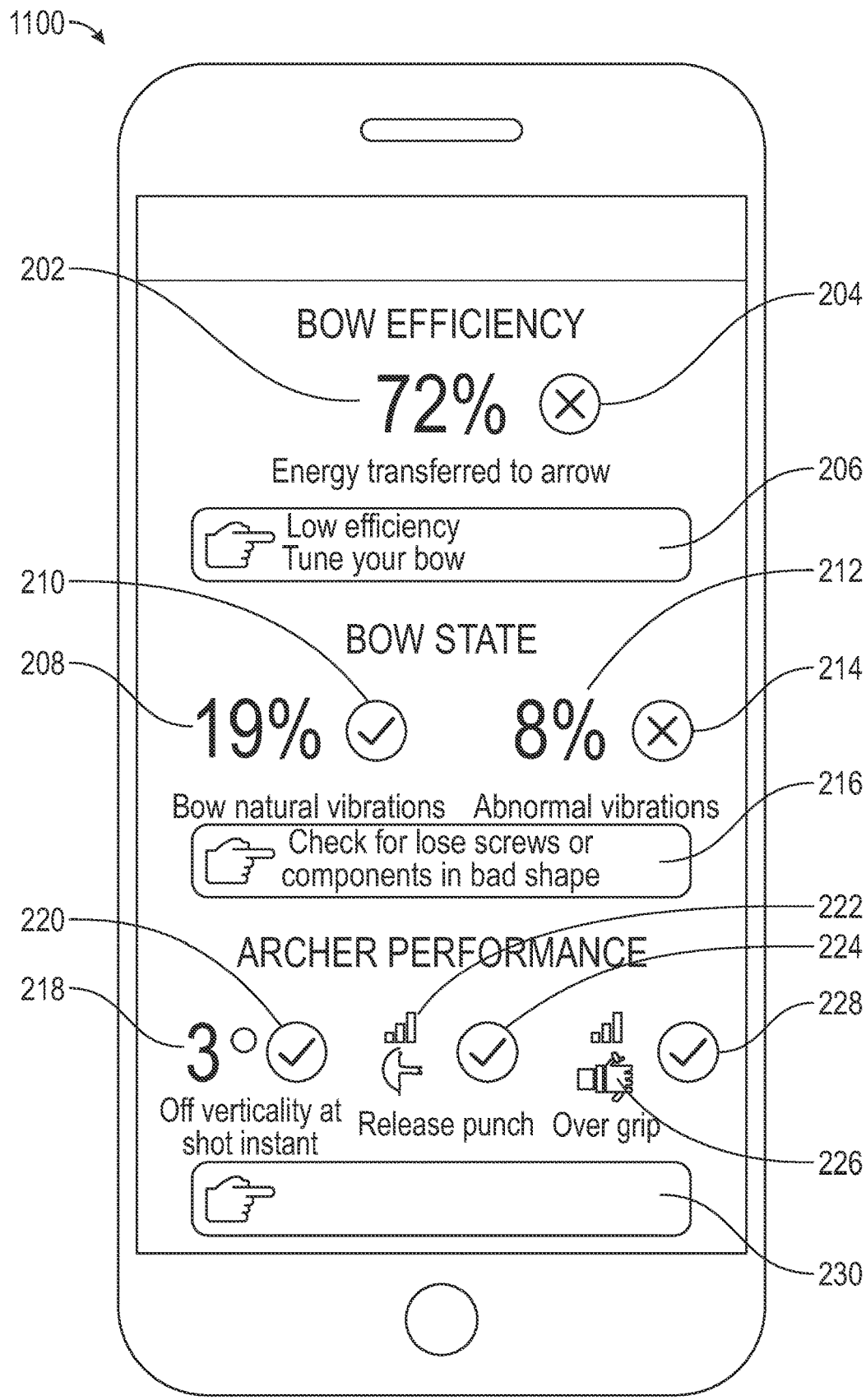
FIG. 17 illustrates an example display of an example receiver configured to communicate with a bow element and/or bow body as per an aspect of an embodiment.

FIG. 17 illustrates an example display 1700 of an example receiver configured to communicate with a bow element and/or a bow body as per an aspect of an embodiment. The display 1700 may be in communication with a receiver processor. The display 1700 may be configured to present resulting information. The display 1700 may be configured to present performance information. The display 1700 may be configured to present bow efficiency information 202. The bow efficiency information may include the energy transferred from the bow to an archery projectile. The energy transferred may be calculated. The display 1700 may be configured to present a bow efficiency status 204. The bow efficiency status 204 may be based on a bow efficiency threshold. The display 1700 may be configured to present at least one efficiency recommendation 206. The at least one efficiency recommendation 206 may be based on resulting information. The at least one efficiency recommendation 206 may be based on performance information. The display 1700 may be configured to present natural vibration information 208. The display 1700 may be configured to present a natural vibration information status 210. The natural vibration information status 210 may be based on a natural vibration threshold. The display 1700 may be configured to present abnormal vibration information 212. The display 1700 may be configured to present an abnormal vibration information status 214. The abnormal vibration information status 214 may be based on an abnormal vibration threshold. The display 1700 may be configured to present at least one vibration recommendation 216. The display 1700 may be configured to position information 218. The position information 218 may comprise lean information, tilt information, rotation information, combinations thereof, and/or the like. The display 1700 may be configured to present a position information status 220. The position information status 220 may be based on a position threshold. The position threshold may comprise a lean threshold, a tilt threshold, a rotation threshold, combinations thereof, and/or the like. The display 1700 may be configured to present release information 222. The display 1700 may be configured to present a release information status 224. The release information status 224 may be based on a release threshold. The display 1700 may be configured to present grip information 226. The display 1700 may be configured to present a grip information status 228. The grip information status 228 may be based on a grip threshold. The display 1700 may be configured to present at least one performance recommendation 230. The at least one performance recommendation 230 may be based on resulting information. The at least one performance recommendation 230 may be based on performance information.

Figure 18:
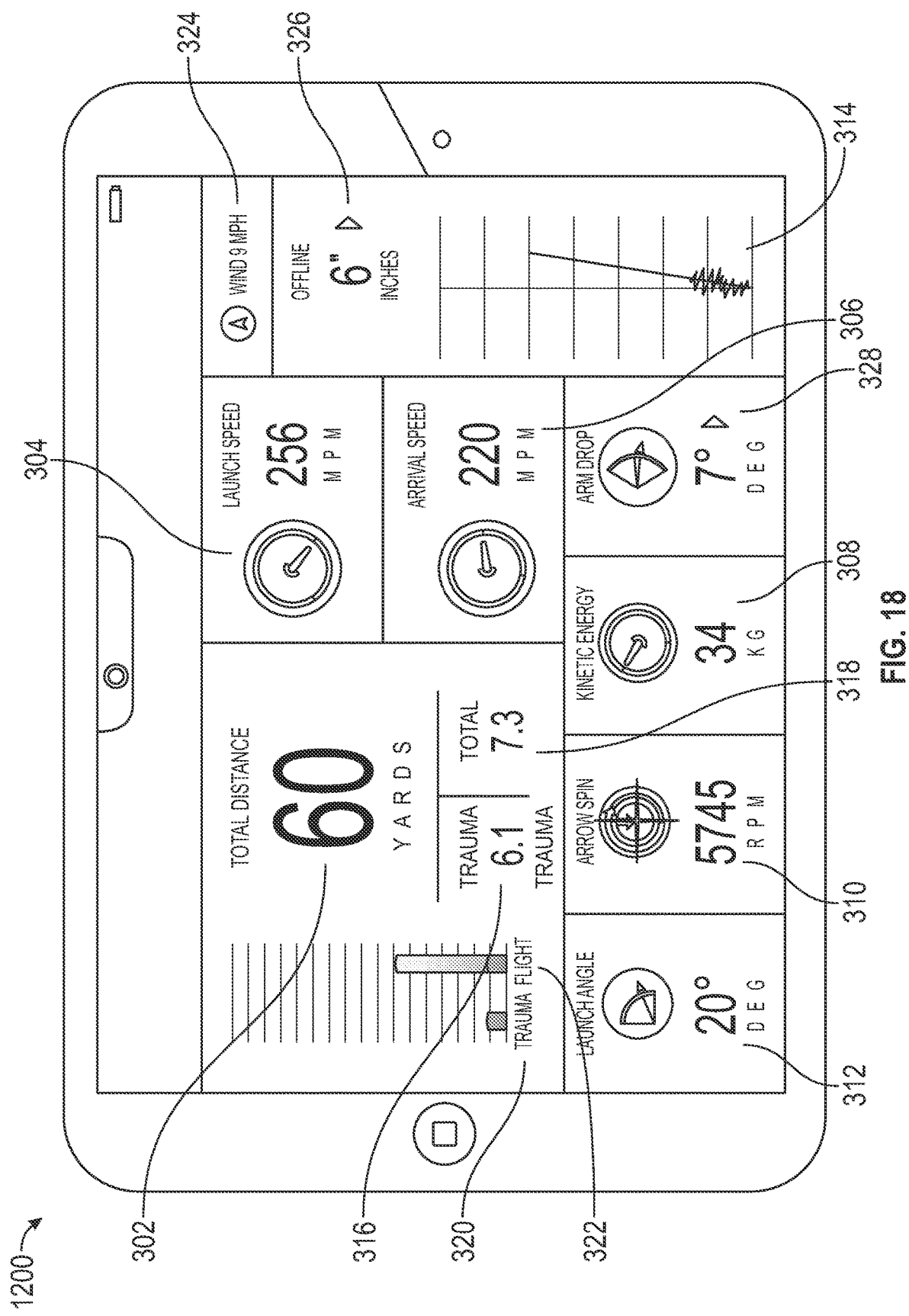
FIG. 18 illustrates an example display of an example receiver configured to communicate with a bow element and/or bow body as per an aspect of an embodiment.

FIG. 18 illustrates an example display 1800 of an example receiver configured to communicate with a bow element and/or a bow body as per an aspect of an embodiment. The display 1800 may be in communication with a receiver processor. The display 1800 may be configured to present resulting information. The display 1800 may be configured to present performance information. The display 1800 may be configured to present distance information 302. The display 1800 may be configured to present velocity information at launch 304. The display 1800 may be configured to present velocity information at impact 306. The display 1800 may be configured to present kinetic energy information 308. The display 1800 may be configured to present projectile rotation information 310. The display 1800 may be configured to present lean angle information 312. The display 1800 may be configured to present flight path information 314. The display 1800 may be configured to present trauma score information 316. The display 1800 may be configured to present flight score information 318. The display 1800 may be configured to present a graph of a trauma score 320. The display 1800 may be configured to present a graph of a flight score 322. The display 1800 may be configured to present wind information 324. The display 1800 may be configured to present offline information 326. The display 1800 may be configured to present arm drop information 328. The arm drop information 328 may be based on a change in lean angle during or immediately following a shot.

According to an embodiment, at least part of a bow element may be delivered to a user. Instructions may be communicated to the user. The instructions may instruct the user to install a body of the bow element into a stabilizer mounting facility on an archery bow. The instructions may instruct the user to install at least one application on a receiver such as a smartphone, tablet, or other computing device. The instructions may instruct the user to attach a bow stabilizer to the body. The instructions may instruct the user to shoot one or more archery projectiles one or more times with the body installed. The instructions may instruct the user to communicate sampled information, resulting information, performance information, combinations thereof, and/or the like to a specific destination. The instructions may instruct the user to return at least part of a bow element to a specific destination. One or more recommendations may be communicated to the user.

According to an embodiment, an archery bow may comprise a stabilizer mounting facility. A bow element may comprise a body. The body may comprise a first mounting facility. The first mounting facility may be configured for connection to the stabilizer mounting facility. The body may comprise a second mounting facility. The second mounting facility may be configured for connection to a bow stabilizer. The body may include an accelerometer. The bow element may comprise a processor. The processor may be connected to the accelerometer. The processor may be configured to receive three-dimensional acceleration information from the accelerometer. The processor may be operable to generate sampled information based on the three-dimensional acceleration information. The bow element may comprise a transmitter. The transmitter may be connected to the processor. The transmitter may be operable to transmit the sampled information.

According to an embodiment, a first mounting facility may be a threaded shaft. A second mounting facility may be a threaded bore.

According to an embodiment, an accelerometer may be a tri-axial accelerometer.

According to an embodiment, three-dimensional acceleration information may be generated at a rate ranging between 50 and 3200 times per second.

According to an embodiment, a bow element may include a power source connected to a body.

According to an embodiment, a transmitter may be a Bluetooth wireless device.

According to an embodiment, a transmitter may be adapted to transmit a plurality of sequential packets of sampled information prior to a flight of an archery projectile.

According to an embodiment, a bow element may include an indicator on a body. The indicator may be operable to visually display a plurality of different statuses. The indicator may be a multi-color illuminator.

According to an embodiment, a transmitter may be configured to communicate with a receiver app. The receiver app may be embodied in a receiver mechanically separate from, and operably connected to the transmitter. The receiver app may be operable to generate a display based on sampled information. The receiver app may be adapted to generate resulting information based on the sampled information.

According to an embodiment, a receiver may include a storage facility including stored data. A receiver processor may be adapted to generate performance information based on the resulting information and based on the stored data.

According to an embodiment, a bow element may include a capacitive switch on the body.

According to an embodiment, an accelerometer may be adapted to detect lean of a body axis defined by a first mounting facility and a second mounting facility when a bow element is connected to an archery bow and the archery bow is in a shooting position. During lean, a first end of the body axis may be raised or lowered horizontally with respect to a second end of the body axis.

According to an embodiment, an accelerometer may be adapted to detect tilt of an archery bow axis defined by a length of an archery bow spanning bow limbs when a bow element is connected to the archery bow and the archery bow is in a shooting position. During tilt, the archery bow axis is rotated clockwise or counter-clockwise about a body axis.

According to an embodiment, an accelerometer may be adapted to detect rotation about a bow axis when a bow element is connected to an archery bow and the archery bow is in a shooting position.

According to an embodiment, an archery bow may comprise a bow body. The bow body may comprise a stabilizer mounting facility. The stabilizer mounting facility may be configured for connection to a bow stabilizer. The bow body may include an accelerometer. The accelerometer may be proximate the stabilizer mounting facility. The archery bow may comprise a processor. The processor may be connected to the accelerometer. The processor may be configured to receive three-dimensional acceleration information from the accelerometer. The processor may be operable to generate sampled information based on the three-dimensional acceleration information. The archery bow may comprise a transmitter. The transmitter may be connected to the processor. The transmitter may be operable to transmit the sampled information.

According to an embodiment, a stabilizer mounting facility may be a threaded bore.

According to an embodiment, an archery bow may include a power source connected to a bow body.

According to an embodiment, an archery bow may include an indicator on a bow body. The indicator may be operable to visually display a plurality of different statuses.

According to an embodiment, an accelerometer may be adapted to detect lean of a stabilizer axis defined by a stabilizer mounting facility when an archery bow is in a shooting position. During lean, a first end of the stabilizer axis may be raised or lowered horizontally with respect to a second end of the stabilizer axis.

According to an embodiment, an accelerometer may be adapted to detect tilt of an archery bow axis defined by a length of an archery bow spanning bow limbs when the archery bow is in a shooting position. During tilt, the archery bow axis is rotated clockwise or counter-clockwise about a stabilizer axis.

According to an embodiment, an accelerometer may be adapted to detect rotation about a bow axis when an archery bow is in a shooting position.

According to an embodiment, an archery bow may include a capacitive switch on a bow body.

Figure 19:
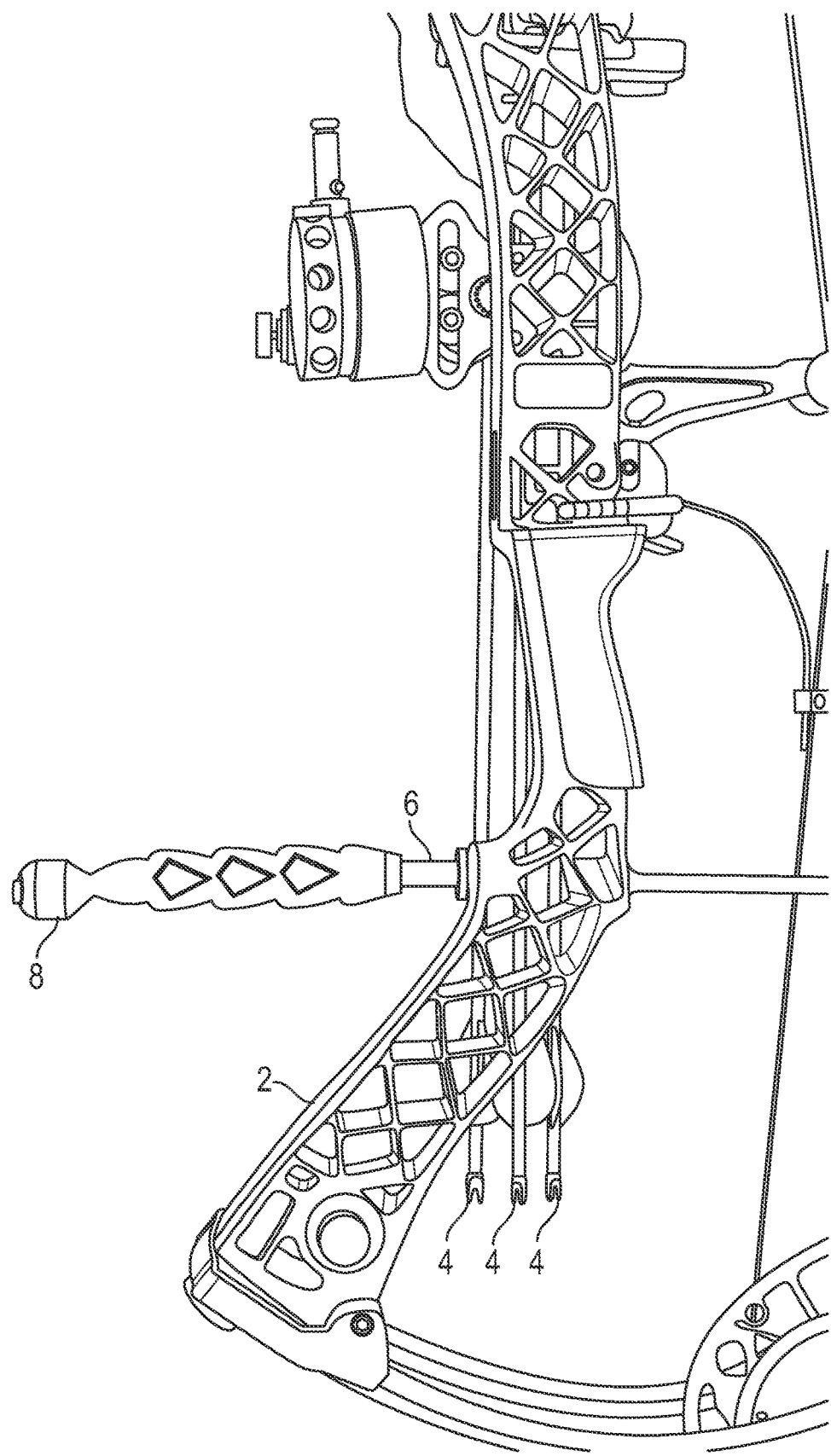
FIG. 19 illustrates an example archery bow with an example bow element and an optional bow stabilizer according to various aspects of an embodiment.

FIG. 19 illustrates an additional example of an archery bow 102 with an example bow element 106 and a bow stabilizer 108 according to various aspects of an embodiment. The archery bow 102 may comprise a stabilizer mounting facility. The bow element 106 may comprise a body. The body may comprise a first mounting facility configured for connection to the stabilizer mounting facility. The body may comprise a second mounting facility configured for connection to the bow stabilizer 108. The archery bow 102 may be configured to shoot a plurality of archery projectiles 104.

Figure 20A:
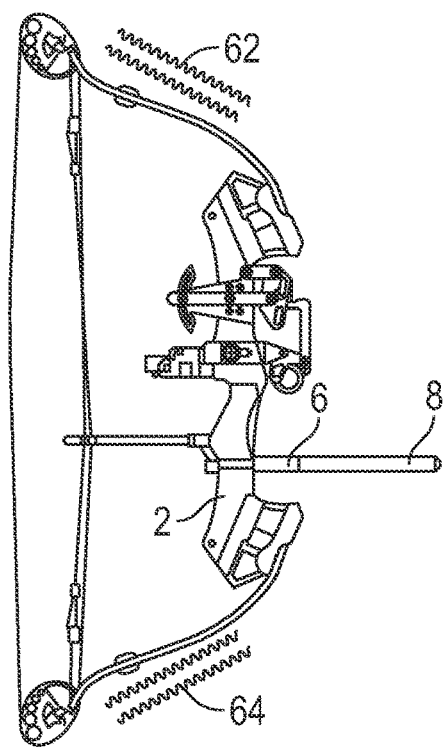
FIGS. 20A and 20B illustrate example vibrations of an example archery bow according to various aspects of an embodiment.
Figure 20B:
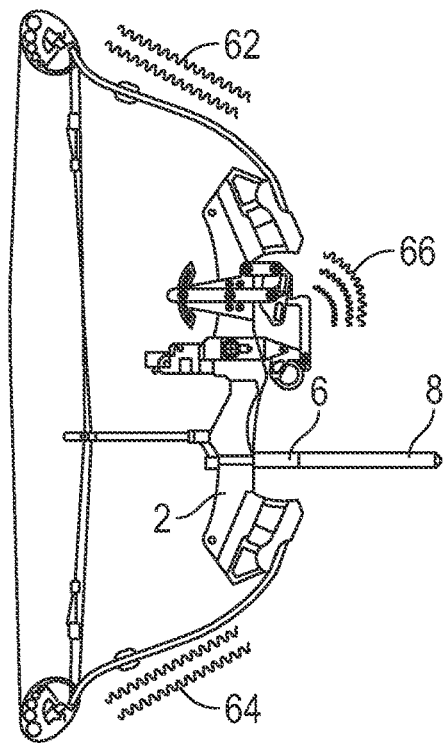

FIGS. 20A and 20B illustrate example vibrations of an additional example of an archery bow 102 according to various aspects of an embodiment. A bow element 106 may be threadably connected to the archery bow 102. A bow stabilizer 108 may be threadably connected to the bow element 106. During and/or immediately following a shot, the bow element 106 may be adapted to detect natural vibrations (162 and 164). During and/or immediately following a shot, the bow element 106 may be adapted to detect abnormal vibrations 166.

The body may have a first fastener removably attached to the stabilizer mounting receptacle. The body may include an accelerometer. A processor may be connected to the accelerometer, the processor configured to receive three-dimensional acceleration information from the accelerometer, the processor operable to generate sampled information based on the three-dimensional acceleration information. A transmitter may be connected to the processor, the transmitter operable to transmit the sampled information. The body may include a stabilizer. The body may be an elongated body with the first fastener at a first end of the body, and the accelerometer proximate to the first end. The accelerometer may be proximate to the first fastener. The stabilizer may include a flexible portion away from the first fastener. The stabilizer may be flexibly connected to the first fastener, and the accelerometer may be rigidly connected to the first fastener. The first fastener may be a threaded shaft. The accelerometer may be a tri-axial accelerometer. There may be a power source connected to the body. The transmitter may be a Bluetooth wireless device. There may be an indicator on the body, the indicator operable to visually display a plurality of different statuses. The indicator may be a multi-color illuminator. The transmitter may be configured to communicate with a receiver app embodied in a receiver mechanically separate from, and operably connected to the transmitter. The receiver app may be operable to generate a display based on the sampled information. There may be a capacitive switch on the body.

Various embodiments have been presented. Each of these embodiments may of course include features from other embodiments presented, and embodiments not specifically described may include various features described herein.

A person of ordinary skill in the art will appreciate that components shown in and described with respect to the figures are provided by way of example only. Numerous other configurations are possible. Accordingly, embodiments of the present disclosure should not be construed as being limited to any particular configuration. It will be appreciated that while the disclosure may in certain instances describe a single example embodiment, there may be other configurations, shapes, and orientations of facilities and components without departing from example embodiments of the present disclosure. A person of ordinary skill in the art will recognize the applicability of embodiments of the present disclosure to various archery arrow shafts, bolts, broadheads, tips, fletching, bows, stabilizers, crossbows, and combinations thereof known in the art. A person of ordinary skill in the art may recognize that embodiments of the present disclosure may comprise fabricated, milled, printed, extruded, molded, combinations thereof, and/or the like parts comprising one material or a plurality of materials. A person of ordinary skill in the art will appreciate that components and elements shown in and described with respect to FIGS. 1-18 are provided by way of example only. Numerous other archery projectiles, bows, stabilizers, crossbows, receivers, microchips, and various archery and electrical component configurations are possible. Accordingly, embodiments of the present disclosure should not be construed as being limited to any particular archery projectile, bow, stabilizer, crossbow, or archery component. Additionally, it is to be recognized that, while the present disclosure has been described above in terms of various embodiments, it is not limited thereto. Various features, aspects, and/or components of the above described present disclosure may be used individually or jointly. Accordingly, the claims set forth below should be construed in view of the full breadth of the embodiments as disclosed herein.

In this specification, "a" and "an" and similar phrases are to be interpreted as "at least one" and "one or more." References to "a", "an", and "one" are not to be interpreted as "only one". References to "an" embodiment in this disclosure are not necessarily to the same embodiment.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a facility described as having three optional features may be embodied in seven different ways, namely with just one of the three possible features, with any two of the three possible features or with all three of the three possible features.

Further, the purpose of the Abstract of the Disclosure is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

We claim:

1. An accessory for an archery bow with a stabilizer mounting receptacle configured to removably receive a stabilizer fastener, the accessory comprising;
    a body;
    the body having a first fastener removably attached to the stabilizer mounting receptacle;
    the body including an accelerometer;
    a processor connected to the accelerometer, the processor configured to receive three-dimensional acceleration information from the accelerometer, the processor operable to generate sampled information based on the three-dimensional acceleration information;
    a transmitter connected to the processor, the transmitter operable to transmit the sampled information; and
    the body including a stabilizer.

2. The accessory according to claim 1 wherein the body is an elongated body with the first fastener at a first end of the body, and the accelerometer proximate to the first end.

3. The accessory according to claim 1 wherein the accelerometer is proximate to the first fastener.

4. The accessory according to claim 1 wherein the stabilizer includes a flexible portion away from the first fastener.

5. The accessory according to claim 1 wherein the stabilizer is flexibly connected to the first fastener and the accelerometer is rigidly connected to the first fastener.

6. The accessory according to claim 1, wherein the first fastener is a threaded shaft.

7. The accessory according to claim 1, wherein the accelerometer is a tri-axial accelerometer.

8. The accessory according to claim 1, including a power source connected to the body.

9. The accessory according to claim 1, wherein the transmitter is a Bluetooth wireless device.

10. The accessory according to claim 1, including an indicator on the body, the indicator operable to visually display a plurality of different statuses.

11. The accessory according to claim 10, wherein the indicator is a multi-color illuminator.

12. The accessory according to claim 1, wherein the transmitter is configured to communicate with a receiver app embodied in a receiver mechanically separate from, and operably connected to the transmitter.

13. The accessory according to claim 12, wherein the receiver app is operable to generate a display based on the sampled information.

14. The accessory according to claim 1, including a capacitive switch on the body.

* * * * *